US011366969B2

(12) United States Patent
Rajani et al.

(10) Patent No.: US 11,366,969 B2
(45) Date of Patent: Jun. 21, 2022

(54) LEVERAGING LANGUAGE MODELS FOR GENERATING COMMONSENSE EXPLANATIONS

(71) Applicant: salesforce.com, inc., San Francisco, CA (US)

(72) Inventors: Nazneen Rajani, Palo Alto, CA (US); Bryan McCann, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 168 days.

(21) Appl. No.: 16/393,801

(22) Filed: Apr. 24, 2019

(65) Prior Publication Data

US 2020/0285704 A1 Sep. 10, 2020

Related U.S. Application Data

(60) Provisional application No. 62/813,697, filed on Mar. 4, 2019.

(51) Int. Cl.

*G06F 40/30* (2020.01)
*G06F 40/284* (2020.01)
*G06N 5/02* (2006.01)

(52) U.S. Cl.

CPC ............ *G06F 40/30* (2020.01); *G06F 40/284* (2020.01); *G06N 5/02* (2013.01)

(58) Field of Classification Search

CPC ........ G06F 40/30; G06F 40/284; G06F 40/00; G06F 40/117; G06F 40/20; G06F 40/279; G06F 40/40; G06N 5/00; G06N 5/02

See application file for complete search history.

(56) References Cited

U.S. PATENT DOCUMENTS 9,311,301 B1 * 4/2016 Balluru ................. G06F 40/211
10,282,663 B2 5/2019 Socher et al.
10,346,721 B2 7/2019 Albright et al.
2014/0108322 A1 * 4/2014 Buchanan ................ G06N 5/02 706/50
2016/0350653 A1 12/2016 Socher et al.
2017/0011026 A1 * 1/2017 Byron ................. G06F 16/3329
2017/0024645 A1 1/2017 Socher et al.
2017/0032280 A1 2/2017 Socher
2017/0124479 A1 * 5/2017 Baughman ............ G06N 20/00
2017/0140240 A1 5/2017 Socher (Continued)

OTHER PUBLICATIONS

A. Vaswani, N. Shazeer, N. Parmar, J. Uszkoreit, L. Jones, A. N. Gomez, Ł. Kaiser, and I. Polosukhin. "Attention is all you need." In Advances in Neural Information Processing Systems, pp. 6000-6010, 2017 (Year: 2017).*

(Continued)

*Primary Examiner* — Daniel C Washburn
*Assistant Examiner* — Sean E Serraguard
(74) *Attorney, Agent, or Firm* — Haynes and Boone, LLP

(57) ABSTRACT

According to some embodiments, systems and methods are provided to develop or provide common sense auto-generated explanations (CAGE) for the reasoning used by an artificial intelligence, neural network, or deep learning model to make a prediction. In some embodiments, the systems and methods use supervised fine-tuning on a language model (LM) to generate such explanations. These explanations may then be used for downstream classification.

17 Claims, 8 Drawing Sheets

(56) References Cited

U.S. PATENT DOCUMENTS

2018/0082171 A1 3/2018 Merity et al.
2018/0096219 A1 4/2018 Socher
2018/0121787 A1 5/2018 Hashimoto et al.
2018/0121788 A1 5/2018 Hashimoto et al.
2018/0121799 A1 5/2018 Hashimoto et al.
2018/0129931 A1 5/2018 Bradbury et al.
2018/0129937 A1 5/2018 Bradbury et al.
2018/0129938 A1 5/2018 Xiong et al.
2018/0143966 A1 5/2018 Lu et al.
2018/0144208 A1 5/2018 Lu et al.
2018/0144248 A1 5/2018 Lu et al.
2018/0268287 A1 9/2018 Johansen et al.
2018/0268298 A1 9/2018 Johansen et al.
2018/0300317 A1 10/2018 Bradbury
2018/0300400 A1 10/2018 Paulus
2018/0336198 A1 11/2018 Zhong et al.
2018/0336453 A1 11/2018 Merity et al.
2018/0349359 A1 12/2018 McCann et al.
2018/0373682 A1 12/2018 McCann et al.
2018/0373987 A1 12/2018 Zhang et al.
2019/0130206 A1 5/2019 Trott et al.
2019/0130248 A1 5/2019 Zhong et al.
2019/0130249 A1 5/2019 Bradbury et al.
2019/0130273 A1 5/2019 Keskar et al.
2019/0130312 A1 5/2019 Xiong et al.
2019/0130896 A1 5/2019 Zhou et al.
2019/0130897 A1 5/2019 Zhou et al.
2019/0149834 A1 5/2019 Zhou et al.
2019/0188568 A1 6/2019 Keskar et al.
2019/0213482 A1 7/2019 Socher et al.
2019/0251168 A1 8/2019 McCann et al.
2019/0251431 A1 8/2019 Keskar et al.
2019/0258714 A1 8/2019 Zhong et al.
2019/0258939 A1 8/2019 Min et al.
2019/0286073 A1 9/2019 Asl et al.
2019/0295530 A1 9/2019 Asl et al.
2019/0354567 A1* 11/2019 Dehghani ................ G06N 3/04

OTHER PUBLICATIONS

Lin, Xiao, and Devi Parikh. "Don't just listen, use your imagination: Leveraging visual common sense for non-visual tasks." In Proceedings of the IEEE conference on computer vision and pattern recognition, v3, pp. 1-36. [Retrieved from internet: <https://arxiv.org/pdf/1502.06108v3.pdf>], Jul. 29, 2015 (Year: 2015).*

Bill Yuchen Lin, Xinyue Chen, Jamin Chen, and Xiang Ren. "Kagnet: Knowledge-aware graph networks for commonsense reasoning." arXiv preprint arXiv:1909.02151, pp. 1-11, [Retrieved from internet: <https://arxiv.org/pdf/1909.02151.pdf>], [Published online: Sep. 4, 2019] (Year: 2019).*

Bauer et al., "Commonsense for Generative Multi-Hop Question Answering Tasks," arxiv.org, Cornell University Library, 201 Olin Library Cornell University Ithaca, NY 14853, Sep. 17, 2018 (Sep. 17, 2018) pp. 1-22.

International Search Report and Written Opinion from PCT Application No. PCT/US2020/019453, dated Jun. 19, 2020, pp. 1-18.

Lin et al., "Don't Just Listen, Use Your Imagination: Leveraging Visual Common Sense for Non-Visual Tasks," 2015 IEEE Conference on Computer Vision and Pattern Recognition (CVPR), IEEE, Jun. 7, 2015, pp. 2984-2993.

Li et al., "VQA-E: Explaining, Elaborating, and Enhancing Your Answers for Visual Questions", arxiv.org, Cornell University Library, 201 Olin Library Cornell University Ithaca, NY 14853, Mar. 20, 2018, pp. 1-43.

Park et al., "Multimodal Explanations: Justifying Decisions and Pointing to the Evidence," 2018 IEEE/CVF Conference on Computer Vision and Pattern Recognition, IEEE, Jun. 18, 2018, pp. 8779-8788.

Rajani et al., "Explain Yourself! Leveraging Language Models for Conmonsense Reasoning," arxiv.org, Cornell University Library, 201 Olin Library Cornell University Ithaca, NY 14853, Jun. 6, 2019, pp. 1-11.

Talmor et al., "CommonsenseQA: A Question Answering Challenge Targeting Commonsense Knowledge," arxiv.org, Cornell University Library, 201 Olin Library Cornell University Ithaca, NY 14853, Nov. 2, 2018, pp. 1-10.

Zellers et al., "From Recognition to Cognition: Visual Conmonsense Reasoning," 2019 I EEE/CVF Conference on Computer Vision and Pattern Recognition (CVPR), Nov. 27, 2018 (Nov. 27, 2018), pp. 6713-6724.

Bowman et al., "A Large Annotated Corpus for Learning Natural Language Inference," in Proceedings of the 2015 Conference on Empirical Methods in Natural Language Processing (EMNLP2015), 2015, pp. 632-642.

Camburu et al., "e-SNLI: Natural Language Inference with Natural Language Explanations," In Advances in Neural Information Processing Systems (NeurIPS2018), 2018, pp. 9560-9572.

Conneau et al., "Supervised Learning of Universal Sentence Representations From Natural Language Inference Data," in Proceedings of the 2017 Conference on Empirical Methods in Natured Language Processing (EMNLP2017), 2017, pp. 670-680.

Dai et al., "Semi-Supervised Sequence Learning," In Proceedings of the 28th International Conference on Neural Information Processing Svstems (NIPS2015), MIT Press, 2015, pp. 3079-3087.

Devlin et al., "Bert: Pre-Training of Deep Bidirectional Transformers for Language Understanding," arXiv preprint arXiv:1810.04805, 2018, pp. 1-16.

Hancock et al., "Training Classifiers With Natural Language Explanations," In Proceedings of the 56th Annual Meeting of the Association for Computational Linguistics (ACL2018), 2018, pp. 1884-1895.

Howard et al., "Universal Language Model Fine-Tuning for Text Classification," In Proceedings of the 56th Annual Meeting of the Association for Computational Linguistics (ACL2018), 2018, pp. 328-339.

Lei et al., "Rationalizing Neural Predictions," In Proceedings of the 2016 Conference on Empirical Methods in Natural Language Processing (EMNLP2016), 2016, pp. 107-117.

Levesque et al., "The Winograd Schema Challenge," In Thirteenth International Conference on the Principles of Knowledge Representation and Reasoning, 2012, pp. 552-561.

McCann et al., "Learned in Translation: Contextualized Word Vectors," In Advances in Neural Information Processing Systems, 2017, pp. 6294-6305.

McCann et al., "The Natural Language Decathlon: Multitask Learning as Question Answering," International Conference of Learning Representations (ICLR), 2018, pp. 1-31.

Mikolov et al., "Efficient Estimation of Word Representations in VectorSpace," arXiv preprint arXiv:1301.3781, 2013, pp. 1-12.

Mostafazadeh et al., "A Corpus and Doze Evaluation for Deeper Understanding of Commonsense Stories," In Proceedings of the 2016 Conference of the North American Chapter of the Association for Computational Linguistics: Human Language Technologies (NAACL2016), pp. 839-849.

Papineni et al., "Bleu: A Method for Automatic Evaluation of Machine Translation," In Proceedings of the 40th Annual meeting on Association for Computational Linguistics (ACL2002), 2002, pp. 311-318.

Pennington et al., "Glove: Global Vectors for Word Representation," In Proceedings of the 2014 conference on empirical methods in natural language processing (EMNLP2014), 2014, pp. 1532-1543.

Peters et al., "Deep Contextualized Word Representations," NAACL., 2018, pp. 1-15.

Radford et al., "Improving Language Understanding by Generative Pre-training," https://S3-us-west-2.amazonaws.com/openai-assets/research-covers/language-unsupervised/language_understanding_paper.pdf., 2018, pp. 1-12.

Talmor et al., "Commonsenseqa: A Question Answering Challenge Targeting Commonsense Knowledge," NAACL., 2018, pp. 1-10.

Trinh et al., "A Simple Method for Commonsense Reasoning," Computing Research Repository, 2018, pp. 1-12.

Vaswani et al., "Attention is all You Need," In Advances in Neural information Processing Systems (NIPS2017), 2017, pp. 5998-6008.

(56) References Cited

OTHER PUBLICATIONS

Wang et al., "Glue: A Multi-task Benchmark and Analysis Platform for Natural Language Understanding," International Conference of Learning Representations (ICLR), 2018, pp. 1-20.
Winograd, "Understanding Natural Language," Cognitive psychology, 1972, pp. 1-191.
Zellers et al., "Swag: A Large-Scale Adversarial Dataset for Grounded Commonsense Inference," In Proceedings of the 2018 Conference on Empirical Methods in Natural Language Processing (EMNLP2018), 2018, pp. 93-104.
Zhong et al., "Improving Question Answering by Commonsense-Based pre-Training," arXiv preprint arXiv:1809.03568, 2018, pp. 1-7.

* cited by examiner

240

230

210

220

250

| | |
|---|---|
| Question: | While eating a hamburger with friends,what are people trying to do? |
| Choices: | **have fun**, tasty, or indigestion |
| CoS-E: | Usually a hamburger with friends indicates a good time. |
| Question: | After getting drunk people couldn't understand him,it was because of his what? |
| Choices: | lower standards,**slurred speech**, or falling down |
| CoS-E: | People who are drunk have difficulty speaking. |
| Question: | People do what during their time off from work? |
| Choices: | **take trips**, brow shorter, or become hysterical |
| CoS-E: | People usually do something relaxing, such as taking trips,when they don't need to work. |

Table 1: Examples from our CoS-E dataset.

| | |
|---|---|
| Question: | What could people do that involves talking? |
| Choices: | **confession**, carnival, state park |
| CoS-E: | confession is the only vocal action. |
| Reason | people talk to each other |
| Rationale: | people talk to people |
| Question: | Who is not famous for a superhighway with no speed limit? |
| Choices: | city, german, **america** |
| CoS-E: | In America on superhighwy there is no speed limit. |
| Reason | the only thing that is not famous for a superhighway is america |
| Rationale: | america is the only place that is not famous for a superhighway with no speed limit |
| Question: | A child wants to play, what would they likely want? |
| Choices: | **play tag**, breathe, fall down |
| CoS-E: | A child to play tag |
| Reason | Children want to play tag, and they want to play tag with their friends. |
| Rationale: | Children want to play tag, what would they want to do? |
| Question: | A bald eagle is likely to be found on what kind of work? |
| Choices: | Aviary, **painting**, rural area |
| CoS-E: | While we seeing the bald eagle in the sky it will form the painting for us |
| Reason | A bald eagle is likely to be found on a rural area. |
| Rationale: | A bald eagle is likely to be found on a rural area. |
| Question: | They were getting ready for a really long hike, he put the food in his what? |
| Choices: | recycling center, house, **backpack** |
| CoS-E: | Backpacks are used on hikes |
| Reason | a backpack is a place to store food and supplies. |
| Rationale: | a backpack is used to carry food and supplies |
| Question: | You can do knitting to get the feeling of what? |
| Choices: | **relaxation**, your, arthritis |
| CoS-E: | Your are focusing on a repetitive task. |
| Reason | knitting is the only thing that is relaxing. |
| Rationale: | you can do knitting to get the feeling of what? |

| Method | Accuracy (%) |
|---|---|
| BERT (baseline) | 63.8 |
| CoS-E-open-ended (train only) | 65.5 |
| CAGE-reasoning | **72.6** |

*FIG. 13*

LEVERAGING LANGUAGE MODELS FOR GENERATING COMMONSENSE EXPLANATIONS

RELATED APPLICATIONS

This application claims priority to U.S. Provisional Patent Application No. 62/813,697, filed Mar. 4, 2019, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to natural language processing and more specifically to leveraging language models for generating commonsense explanations of reasoning or rationalization.

BACKGROUND

Artificial intelligence, implemented with neural networks and deep learning models, has demonstrated great promise as a technique for automatically analyzing real-world information with human-like accuracy. However, artificial intelligence or deep learning models often cannot explain the reasoning behind, or rationalization for, their predictions or to what extent that reasoning or rationalization is based on commonsense knowledge. This makes it difficult for humans to understand and trust such models.

Accordingly, it would be advantageous to have systems and methods that provide, implement, or improve commonsense reasoning or rationalization in artificial intelligence or deep learning models, and furthermore, generate or provide explanations for that reasoning or rationalization.

BRIEF DESCRIPTION OF THE DRAWINGS

FIG. 2 illustrates examples of questions, answers, and human generated explanations that may be included in a Common Sense Explanations (CoS-E) dataset, according to some embodiments.

FIG. 12 illustrates a table showing a collection of examples from CommonsenseQA, CoS-E, and CAGE samples for reasoning and rationalization, according to some embodiments.

FIG. 13 illustrates a table showing a comparison of results.

Figure 1:
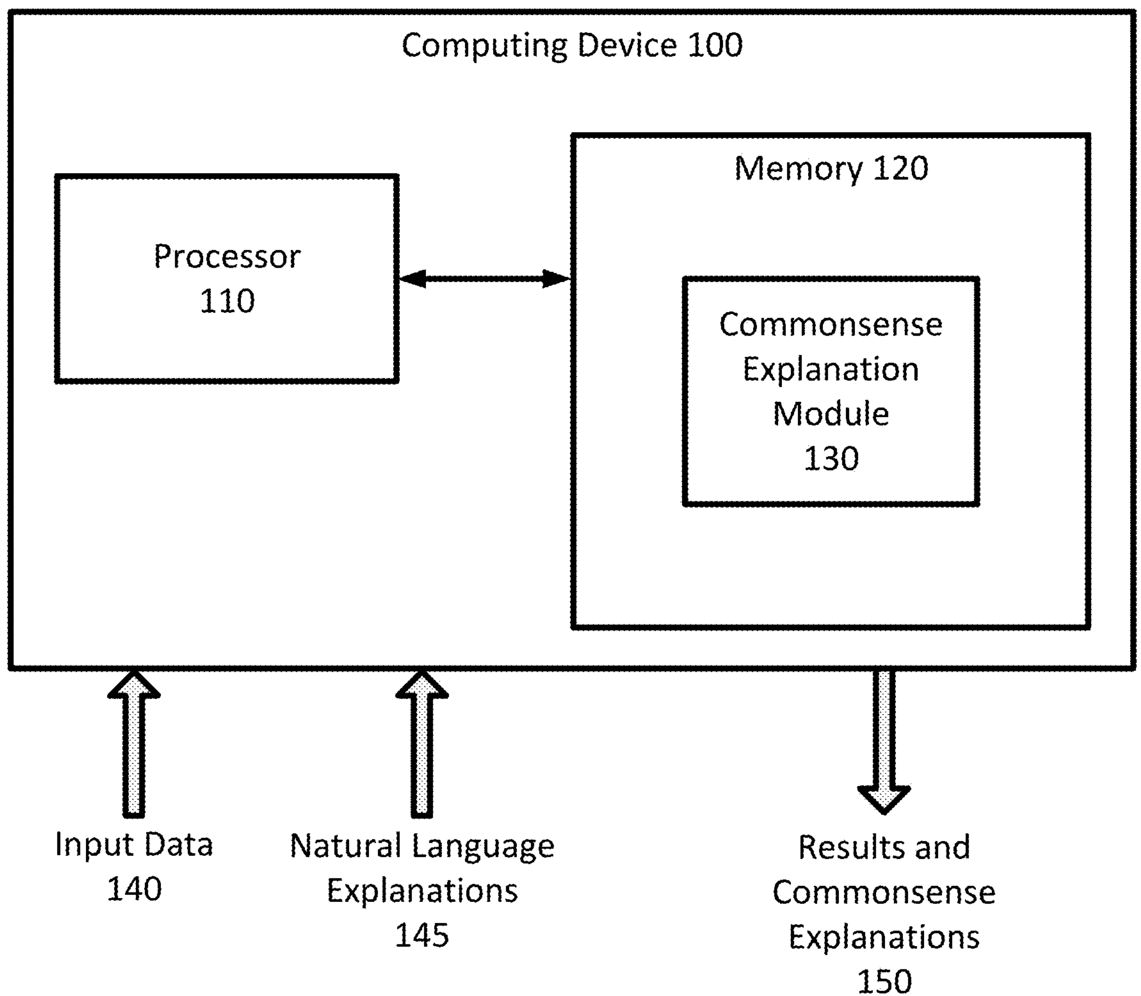
FIG. 1 is a simplified diagram of a computing device according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Artificial intelligence, implemented with neural networks and deep learning models, has demonstrated great promise as a technique for automatically analyzing real-world information with human-like accuracy. In general, such neural network and deep learning models receive input information and make predictions based on the input information. However, these models may face challenges with applying commonsense reasoning or rationalization to develop or explain their predictions. Commonsense reasoning or rationalization is a challenging task for modern machine learning methods.

Artificial intelligence or deep learning models often cannot explain the reasoning or rationalization (commonsense or otherwise) behind their predictions, which makes it difficult for humans to understand and trust such models.

Applying commonsense reasoning or rationalization, and explaining the same, would help to make deep neural networks more transparent to humans and build trust.

According to some embodiments, the present disclosure provides systems and methods that leverage a pretrained language model to generate explanations that are useful for commonsense reasoning or rationalization. In some embodiments, a Commonsense Auto-Generated Explanations (CAGE) is provided as a framework for generating explanations for Common sense Question Answering (CommonsenseQA). CommonsenseQA is a multiple-choice question answering dataset proposed for developing natural language processing (NLP) models with commonsense reasoning capabilities, as described in more detail in Talmor et al., "COMMONSENSEQA: A Question Answering Challenge Targeting Commensense Knowledge," arXiv: 1811.00937v2, Nov. 2, 2018, which is incorporated by reference herein. There are multiple versions of CommonsenseQA (e.g., v1.0, v1.1), any of which can be used in one or more embodiments. NLP is one class of problems to which neural networks may be applied. NLP can be used to instill new neural networks with an understanding of individual words and phrases.

In some embodiments, human explanations for commonsense reasoning are generated and built on top of, or added to, the corpus of CommonsenseQA as Common Sense Explanations (CoS-E). In some embodiments, CoS-E contains human explanations in the form of both open-ended natural language explanations as well as highlighted span annotations that represent words selected by humans as important for predicting the right answer According to some embodiments, the task of commonsense reasoning is broken down into two phases. In the first phase, systems and methods of the present disclosure provides a CommonsenseQA example alongside the corresponding CoS-E explanation to a language model. The language model conditions on the question and answer choices from the example and is trained to generate the CoS-E explanation. In the second phase, systems and methods of the present disclosure use the language model to generate explanations for each example in the training and validation sets of CommonsenseQA. These Commonsense Auto-Generated Explanations (CAGE) are provided to a second commonsense reasoning model by concatenating it to the end of the original question, answer choices, and output of the language model. The two-phase CAGE framework obtains state-of-the-art results outperforming the best reported baseline by 10% and also produces explanations to justify its predictions Commonsense Auto-Generated Explanations (CAGE).

In summary, the present disclosure introduces a new Common Sense Explanations (CoS-E) dataset to study neural commonsense reasoning. The present disclosure provides a new method (CAGE) for automatically generating explanations that achieve a state-of-the-art accuracy of approximately 65% on CommonsenseQA Computing Device FIG. 1 is a simplified diagram of a computing device 100 according to some embodiments. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

As shown, memory 120 includes a commonsense explanation module 130 that may be used to implement and/or emulate the systems and models, and/or to implement any of the methods described further herein. In some examples, commonsense explanation module 130 may be used to develop, derive, or generate predictions, applying commonsense reasoning or rationalization, and to generate or provide explanations of the same as described further herein. In some examples, commonsense explanation module 130 may also handle the iterative training and/or evaluation of a system or model used to generate predictions, applying commonsense reasoning or rationalization, and to generate or provide explanations. In some examples, memory 120 may include non-transitory, tangible, machine readable media that includes executable code that when run by one or more processors (e.g., processor 110) may cause the one or more processors to perform the methods described in further detail herein. In some examples, commonsense explanation module 130 may be implemented using hardware, software, and/or a combination of hardware and software.

As shown, computing device 100 receives as input data 140 and natural language explanations text 145, which are provided to commonsense explanation module 130. The input data 140 may relate to any situation, scenario, problem, etc. for which it is desirable to apply artificial intelligence, neural network, or deep learning model to analyze and make a prediction, e.g., for question answer (QA) or some other NLP task. In some embodiments, the natural language explanations text 145 can include human explanations for common sense reasoning, which can be Common Sense Explanations (CoS-E). The human explanations can be in the form of open-ended natural language explanations as well as highlighted annotations in the original input instances. In some embodiments, the natural language explanations text 145 can include explanations that are auto-generated. The natural language explanations text 145 can be used for fine-tuning or training of commonsense explanation module 130. In some embodiments, this training may occur over one or more iterations executed or performed by the commonsense explanation module 130.

Commonsense explanation module 130 operates on the input data 140 to develop, derive, or generate predictions or results, using natural language explanations text 145 to support or apply commonsense reasoning in doing so. Module 130 may also generate or provide explanations of its reasoning or rationalization. In some embodiments, the commonsense explanation module 130 implements or incorporates a language model (LM) that can generate the explanations. In some embodiments, the commonsense explanation module 130 implements or incorporates a commonsense reasoning model (CSRM) or classification model that develops or generates the predictions or results based, at least in part, on the explanation from the language model (LM). In some embodiments, the commonsense explanation module 130 uses or incorporates the Generative Pre-Trained Transformer (GPT) language model and fine-tunes it on the Commonsense QA training data by conditioning on the question, the answer choices and the human generated explanation. The results and explanations are provided as output 150 from computing device 100.

In some examples, commonsense explanation module 130 may include a single- or multi-layer neural network, with suitable pre-processing, encoding, decoding, and output layers. Neural networks have demonstrated great promise as a technique for automatically analyzing real-world information with human-like accuracy. In general, neural network models receive input information and make predictions based on the input information. Whereas other approaches to analyzing real-world information may involve hard-coded processes, statistical analysis, and/or the like, neural networks learn to make predictions gradually, by a process of trial and error, using a machine learning process. A given neural network model may be trained using a large number of training examples, proceeding iteratively until the neural network model begins to consistently make similar inferences from the training examples that a human might make. Although commonsense explanation module 130 is depicted as a software module, it may be implemented using hardware, software, and/or a combination of hardware and software.

Common Sense Explanations (CoS-E)

According to some embodiments, the language model systems and methods of the present disclosure may utilize or leverage human explanations of commonsense reasoning, which can be in a Common Sense Explanations (CoS-E) dataset. In some embodiments, the CoS-E dataset is added to, or built on top of, the existing CommonsenseQA dataset for use in the language model systems and methods of the present disclosure. The CommonsenseQA dataset consists of two splits, as described in Talmor et al., "COMMONSENSEQA: A Question Answering Challenge Targeting Commensense Knowledge," arXiv:1811.00937v2, Nov. 2, 2018, which is incorporated herein by reference. In some embodiments, the CoS-E dataset, and the language model of the present disclosure, use the more difficult random split, which is the main evaluation split. Each example in CommonsenseQA consists of a question, q, three answer choices, c0, c1, c2, and a labeled answer a. The CoS-E dataset adds a human explanation $e_h$ for why a is the most appropriate choice.

In some embodiments, the human explanations of commonsense reasoning for the CoS-E dataset may be collected, for example, using Amazon Mechanical Turk (MTurk). As shown in the examples illustrated FIG. 2, the system presents or provides human participants with one or more questions 210 (e.g., "While eating a hamburger with friends, what are people trying to do?") and answer choices 220 (e.g., "have fun, tasty, or indigestion") along with the ground-truth answer choice 230 (e.g., "have fun," for example, as indicated in bold). The system prompts the human participants with the following question: "Why is the predicted output the most appropriate answer?" The human participants are instructed by the system to highlight 240 relevant words (e.g., "hamburger with friends") in the question 210 that justifies the ground-truth answer choice 230 and to provide a brief open-ended explanation 250 (e.g., "Usually a hamburger with friends indicates a good time.") based on the highlighted justification that could serve as the commonsense reasoning behind the question. The system collects these explanations to add to, or build on, the CommonsenseQA train-random-split and dev-random-split, which can have a size of 7610 and 950 examples, respectively. The resultant CoS-E dataset includes questions, answer choices, and both free-form explanations and highlighted text for a ground-truth answer choice. The highlighted text or words 240 in the dataset may be referred to as "CoS-E-selected," and the free-form explanation 250 may be referred to as "CoS-E-open-ended."

With respect to collecting human-generated explanations of commonsense reasoning, it may be difficult to control the quality of open-ended annotations (e.g., explanation 250) provided by participants interacting with the system. As such, in some embodiments, the system can perform in-browser checks to avoid or reject obviously bad explanations. In some embodiments, a human annotator is not allowed to move forward in the system if she/he fails to highlight 240 relevant words in the question 210 or if the length of the explanation 250 is less than four words. The system can also check that the explanation 250 is not a sub-string of the question 20 or the answer choices 220 without any other extra words. In some embodiments, the system collects these explanations 250 from one annotator per example. The system can also perform one or more post-collection checks to catch examples that are not caught or identified by the other filters. The system may filter out explanations 250 that could be classified as a template. For example, explanations of the form "<answer> is the only option that is [correct obvious]" may be deleted by the system and then re-presented for annotation by the same or different human participant.

Figure 3:
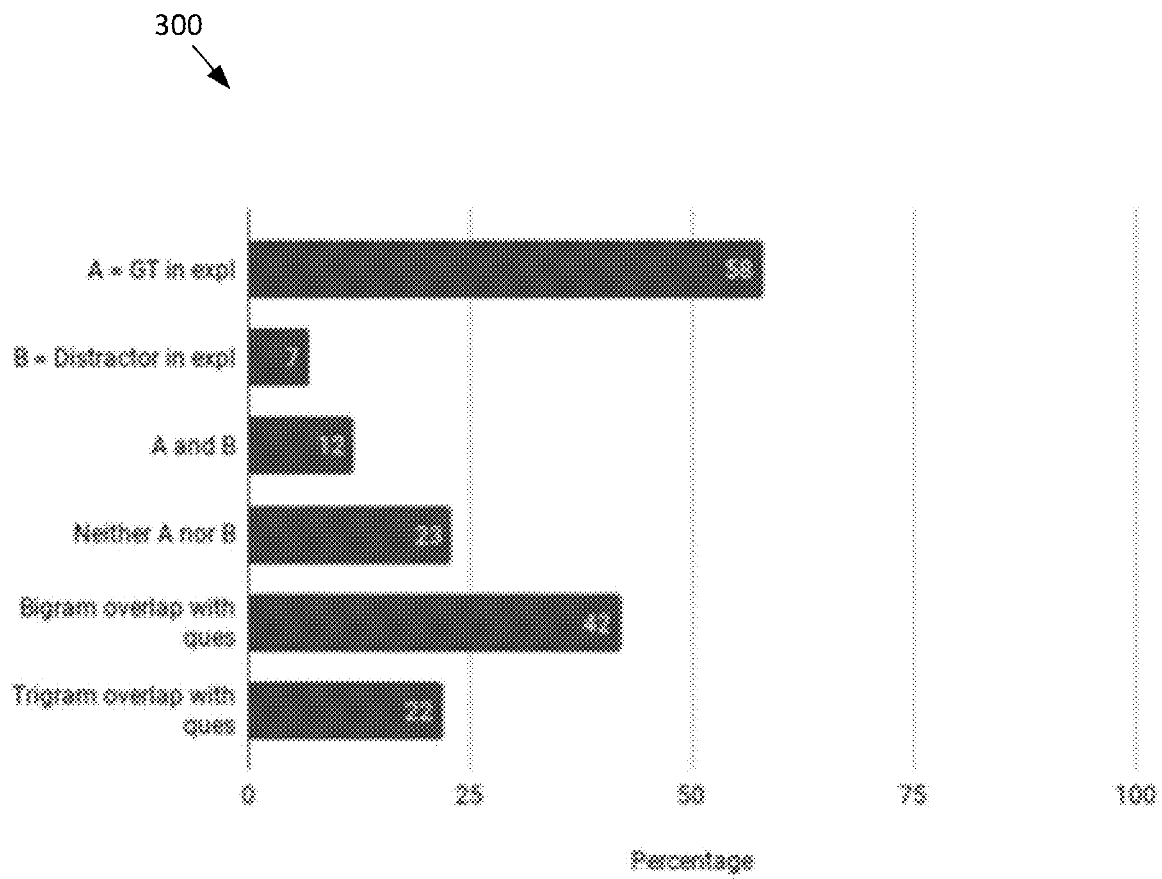
FIG. 3 illustrates an example distribution of explanations collected in the CoS-E dataset, according to some embodiments.

FIG. 3 illustrates an example distribution 300 of explanations (e.g., open-ended explanation 250 of FIG. 2) collected in the CoS-E dataset, in some embodiments. As seen in FIG. 3, 58% of the explanations from CoS-E dataset contain the ground-truth answer choice (e.g., ground-truth answer choice 230)—situation "A". And 7% of the explanations include a distractor (or incorrect choice for the question)—situation "B". 12% of the explanations include both ground-truth and distractor (A and B), while 23% of the explanations do not include either ground-truth or distractor (neither A nor B). 42% of the explanations have a bigram overlap with the question (e.g., question 210), while 22% of the explanations have a trigram overlap with the question.

In some embodiments, the human-generated explanations (e.g., explanation 250 of FIG. 2) of the CoS-E dataset can be provided, for example, as the natural language explanations text 145 that is input to the computing device 100 (FIG. 1) for use by the common sense and explanation module 130. According to some embodiments, the CoS-E dataset is added to the existing CommonsenseQA dataset for use in the language model systems and methods, for example, as implemented or incorporated in module 130. The effectiveness of using the CoS-E dataset for the language model (LM) is not constrained to those specific examples of the dataset. In some embodiments, the language model obtains state-of-the-art results by using the CoS-E dataset only during training. Empirical results show that even when using only those explanations that do not have any word overlap with any of the answer choices, performance exceeds that of baselines that do not use the CoS-E dataset at all. It has also been observed that a significant proportion of the distractor choices are also present in the CoS-E dataset and on further analysis we found that for those examples, annotators resorted to explaining by eliminating the wrong choices. This indicates that it is difficult even for humans to reason about many of the examples in CommonsenseQA. CoS-E also adds diversity of perspective and in particular diverse reasoning on world knowledge to the CommonsenseQA dataset. Even though many explanations remain noisy after quality-control checks, the explanations of the CoS-E dataset are of sufficient quality to train a language model that generates commonsense reasoning.

Commonsense Auto-Generated Explanations (CAGE)

Language model systems and methods may develop, derive, or generate predictions or results for a NLP task, such as, for example, question answering. According to some embodiments, language model systems and methods of the present disclosure generate or output explanations—Commonsense Auto-Generated Explanations (CAGE)—of their reasoning or rationale for their predictions or results. In some embodiments, for example, the language model or module—as implemented or incorporated in the commonsense explanation module 130—generates these explanations in response to or using the input data 140 and natural language explanations text 145. The explanations are generated by a language model and are used as supplementary inputs to a classification model or module.

In some embodiments, CAGE are provided and applied to the CommonsenseQA task. As previously described, each example in CommonsenseQA consists of a question, q, three answer choices, c0, c1, c2, and a labeled answer a; and the CoS-E dataset adds a human explanation $e_h$ for why a is the most appropriate choice. The output of CAGE is a language model generated explanation e that is trained to be close to $e_h$.

According to some embodiments, in order to supply CAGE to a classification model, a a language model (LM) is fine-tuned or modified to generate explanations from the CoS-E dataset. In some embodiments, the language model of the present disclosure can be implemented or incorporate the pre-trained OpenAI Generative Pre-Trained Transformer (GPT). GPT is a multi-layer, transformer (see Vaswani et al., 2017, incorporated by reference herein) decoder.

Figure 4:
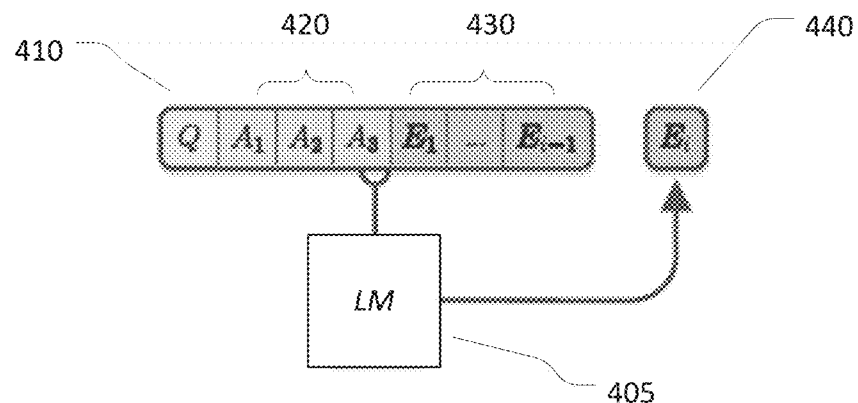
FIG. 4 illustrates an example time-step of training a Commonsense Auto-Generated Explanations (CAGE) language model to generate explanations from CoS-E dataset, according to some embodiments.

In some embodiments, the language model (LM) (e.g., of GPT) is fine-tuned or trained on the combination of CommonsenseQA and CoS-E datasets. This shown, for example, in FIGS. 4 and 5. FIG. 4 illustrates one time-step of training a CAGE language model (LM) or module 405 to generate explanations from CoS-E dataset. In some embodiments, the language model can be implemented in or be part of the commonsense explanation module 130 (FIG. 1). As illustrated, the language model 405 is trained or conditioned on the question tokens Q 410 concatenated with the answer choice tokens $A_1$, $A_2$, $A_3$ 420, and previously human-generated explanation tokens $E_1, \ldots E_{i-1}$ 430. The language model (LM) or module 405 is trained to generate explanation token $E_i$ 440.

Figure 5:
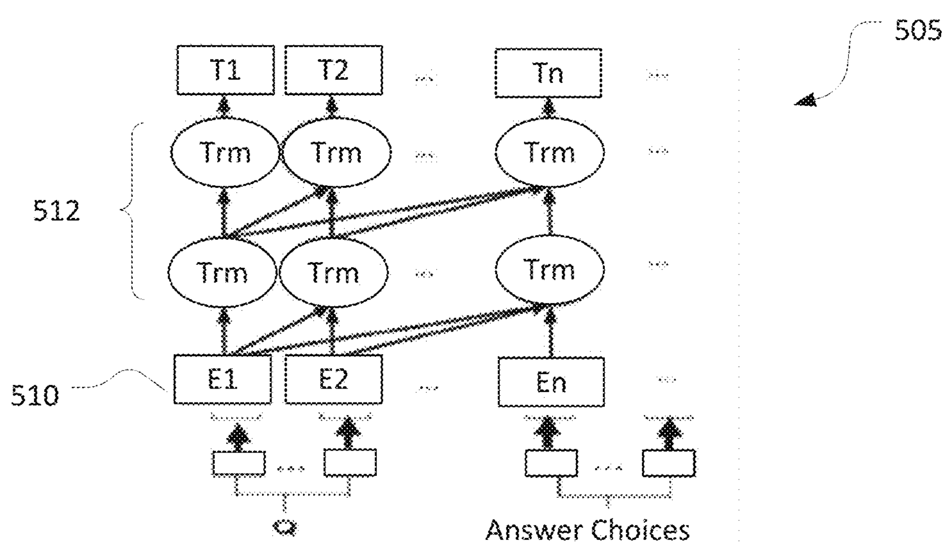
FIG. 5 is a simplified diagram of a language module or model, according to some embodiments.

FIG. 5 is a simplified diagram of a language module or model 505 according to some embodiments. In some embodiments, language model 505 may be consistent with commonsense explanation module 130 and/or the language model 405. In some examples, language model 505 is a multi-layer neural network. As shown in FIG. 5, in some embodiments, this multi-layer neural network can be a multi-layer transformer encoder comprising an embedding module 510 and a transformer module 512. In some embodiments, the embedding module 510 may comprise an embedding layer ($E_1, E_2, \ldots E_N$), and the transformer module 512 may comprise one or more layers of transformers (Trm). In some embodiments, each transformer (Trm) can be implemented with a long short-term memory (LSTM). The language model or module 505 receives structured source text x in the form of question (Q) and answer choices, such as the input data 140. In some embodiments, the structured source text x is in natural language form. The structured source text x is passed to an embedding layer ($E_1, E_2, \ldots E_N$), which breaks the structured source text into tokens $x_i$, where each of the tokens $x_i$ may correspond to a word, a number, a tag, and/or the like. In some embodiments, as shown, the language model or module 505 uses constrained self-attention at the transformer (Trm) layers, where every token can only attend to context to its left. These left-context-only transformer (Trm) layers collectively function as a transformer decoder for text generation. The text ($T_1, T_2, \ldots T_N$) that is generated is for a commonsense explanation $E_i$. Such explanation can be used, in some embodiments, to deduce which of the answer choices is correct for the question.

Figure 6:
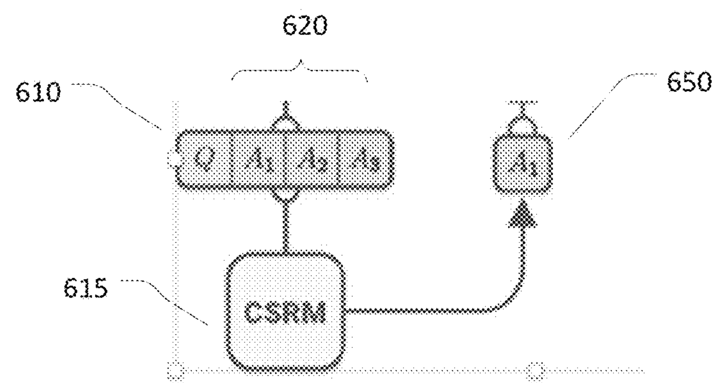
FIG. 6 illustrates an example time-step of a classification model or module to generate a prediction, according to some embodiments.

Given either a human explanation from CoS-E or reasoning/explanation from a language model or module (e.g., 405 or 505), the systems and methods of the present disclosure can learn to perform predictions on the CommonsenseQA task. In some embodiments, a classification model or module, as shown, for example, in FIGS. 6 and 7, generates or derives predictions that are made for the input question-answer sets. FIG. 6 illustrates one time-step of a classification model (CRSM) 615 to generate a prediction. In some embodiments, the classification model can be implemented in or be part of the commonsense explanation module 130 (FIG. 1). As illustrated, the classification model or module 615 receives question tokens Q 610 concatenated with the answer choice tokens $A_1$, $A_2$, $A_3$ 620, and generates or derives the prediction token $A_1$ 650.

In some embodiments, the classification model or module 615 may be implemented or adopt a language representational model, such as a Bidirectional Encoder Representations from Transformers (BERT) model, as described in more detail in Devlin et al., "BERT: Pre-training of Deep Bidirectional Transformers for Language Understanding," arXiv preprint arXiv:1810.04805, Oct. 11, 2018, which is incorporated by reference herein. In some embodiments, the classification model 615 can be implemented or adopt the $BERT_{LARGE}$ model, which can be fine-tuned for multiple choice question answering by adding a simple binary classifier. This classifier takes as input the final state corresponding to the special [CLS] token placed at the start of all inputs to BERT models. For each example in the dataset, the classification model 615 construct three input sequences for fine-tuning $\mathrm{BERT}_{LARGE}$ model. The explanations share the same input representation as that of the questions.

Figure 7:
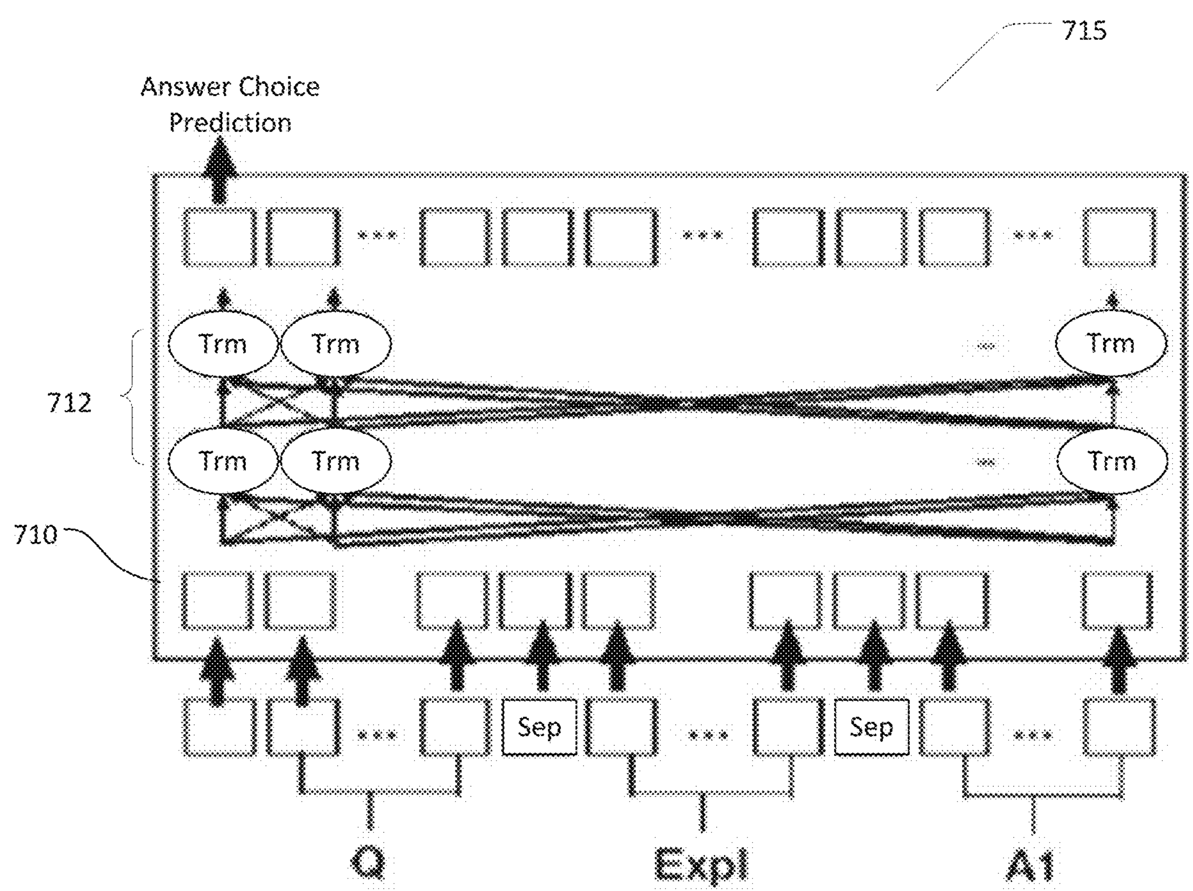
FIG. 7 is a simplified diagram of a classification model or module, according to some embodiments.

FIG. 7 is a simplified diagram of a classification model or module 715 according to some embodiments. In some embodiments, classification model 715 may be consistent with commonsense explanation module 130 and/or the classification model 615. In some examples, classification model 715 is a multi-layer neural network. As shown in FIG. 7, in some embodiments, this multi-layer neural network can be a multi-layer transformer encoder comprising an embedding module 710 and a transformer module 712. In some embodiments, the embedding module 710 may comprise an embedding layer ($E_1, E_2, \ldots E_N$), and transformer module 712 may comprise one or more layers of transformers (Trm). In some embodiments, a long-term short-term memory (LSTM) layer can be used instead of a transformer layer. The classification model or module 715 receives structured source text x in the form of question (Q) and answer choices, such as the input data 140. In some embodiments, the structured text may also include an explanation, for example, generated by a trained language model (e.g., 405 or 505). The question, answer choices, and explanation are separated by separators [SEP] in the input data. In some embodiments, each sequence is the concatenation of the question, a separator token [SEP], and one of the answer choices. If the approach requires explanation from either CoS-E or automatically generated as in the CAGE, the classification model or module 715 concatenates the question, [SEP], the explanation, [SEP], and an answer choice. The structured source text x is passed to the embedding layer ($E_1, E_2, \ldots E_N$), which breaks the structured source text into tokens $x_i$, where each of the tokens $x_i$ may correspond to a word, a number, a tag, and/or the like. In some embodiments, as shown, the classification model 715 uses bidirectional self-attention at the transformer (Trm) layers, where every token can attend to context to its left and right. These transformer (Trm) layers collectively function as a transformer encoder. The classification model or module 715 generates or derives a prediction for an answer choice for the input question.

Two settings or possibilities for the generation of explanations and predictions can be: (1) explain-and-then-predict ("reasoning"); and (2) predict-and-then-explain ("rationalization").

Figure 8:
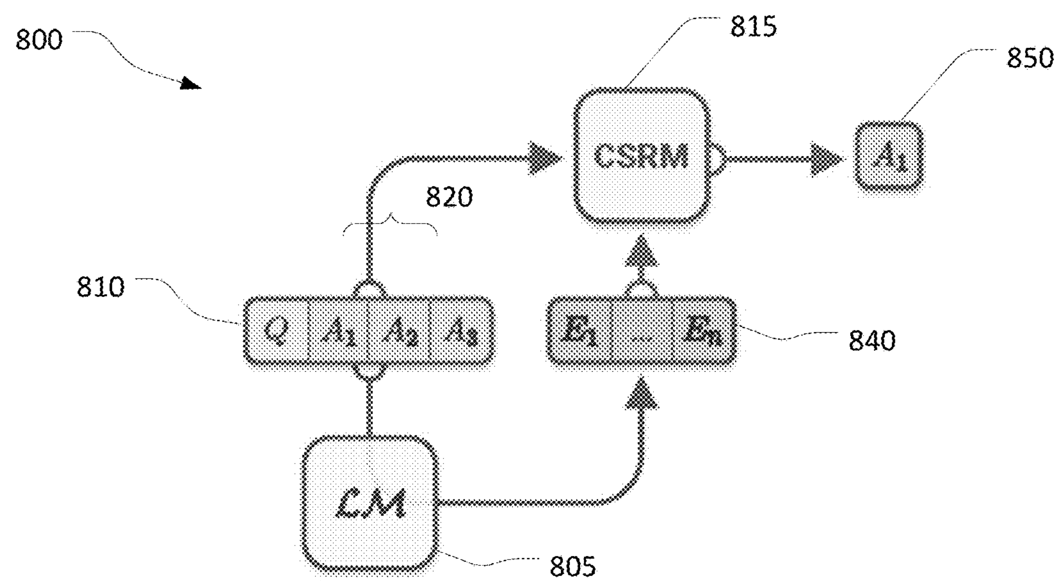
FIG. 8 is a simplified diagram illustrating a system of generating common sense explanations for reasoning by an artificial intelligence or deep learning model, according to some embodiments.
Figure 9:
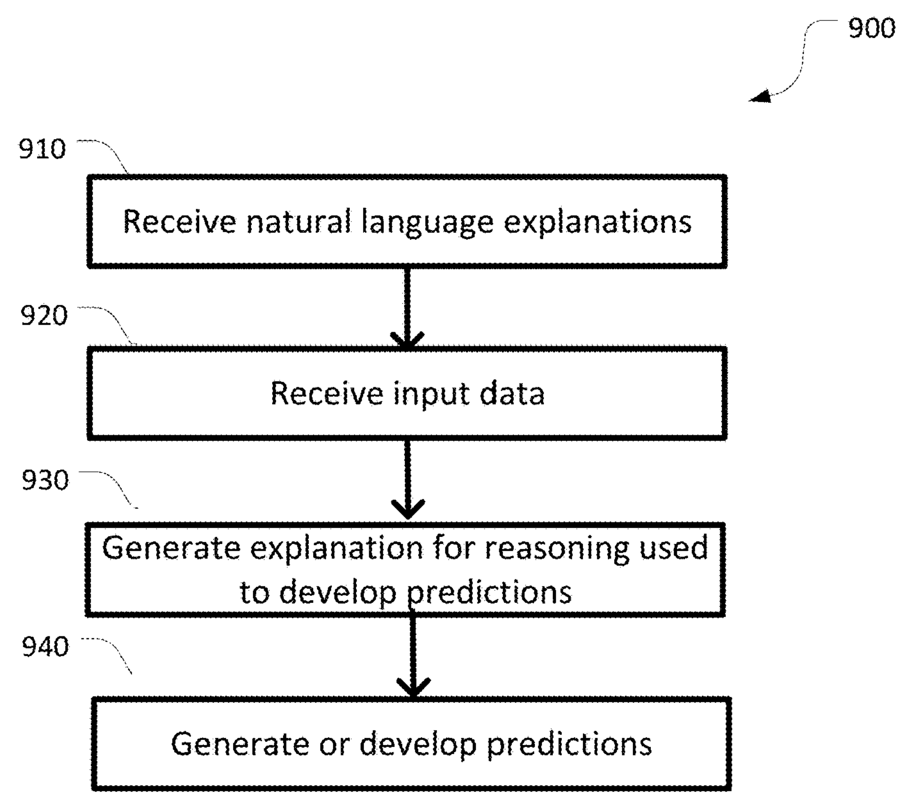
FIG. 9 is a simplified diagram of a method of generating common sense explanations for reasoning by an artificial intelligence or deep learning model, according to some embodiments.

Reasoning: Reasoning is illustrated with respect to FIGS. 8 and 9. FIG. 8 is a simplified diagram illustrating a system 800 of generating common sense explanations for reasoning by an artificial intelligence or deep learning model, according to some embodiments. FIG. 9 is a simplified diagram of a corresponding method 900 for system 800. One or more of the processes 910-940 of method 900 may be implemented, at least in part, in the form of executable code stored on non-transitory, tangible, machine-readable media that when run by one or more processors may cause the one or more processors to perform one or more of the processes 910-940. In some embodiments, system 800 can be implemented in, and method 900 can be performed by, computing device 100 (e.g., commonsense explanation module 130) of FIG. 1.

With reasoning, as illustrated in FIGS. 8 and 9, a trained CAGE language model 805 (which may be consistent with language models or modules 405 and 505) is used to generate explanations 840 for a downstream classification or commonsense reasoning model (CSRM) 815.

For training, at a process 910, the language model 805 receives natural language explanations text. In some examples, the natural language explanations text (e.g., text 145) can include question q and answer choices c0, c1, c2, and explanations $e_h$ collected from or developed by humans.

In some embodiments, the task of collection or development of explanations from humans consists of two parts. In the first part, human annotators are instructed to highlight relevant words in the question that justifies the output. In the second part, annotators are asked to provide a brief open-ended explanation for why the predicted output is correct but not the other choices. These instructions encourage annotators to provide explanations that actually provide the commonsense reasoning behind the question. In some embodiments, the natural language explanations text is used to train, test, and run the language model 805.

With reasoning, the language model (LM) 805 is fine-tuned conditioned on the question q, answer choices c0, c1, c2 and the human generated explanation $e_h$, and not the actual predicted label or answer a. So, the input context $C_{RE}$ during training is defined as follows:

$C_{RE}$="q, c0, c1, or c2? commonsense says"

The language model 805 is trained to generate explanations e according to a conditional language modeling objective.

After the system 800 (e.g., language model 805) has been trained, at a process 920, the language model 805 and a classification model or module 815 receive input data (e.g., input data 140). The input data may relate to any situation, scenario, problem, etc. for which it is desirable to apply artificial intelligence, neural network, or deep learning model to analyze and make a prediction. In some embodiments, as shown, the input data may comprise a question Q 810 and answer choice $A_1, A_2, A_3$ 820.

At a process 930, language model 805 generates or develops an explanation E 840 of commonsense reasoning for potential predictions or results for the input data. This can be accomplished, for example, as described with respect to the language models 405 and 505 of FIGS. 4 and 5. The machine-generated commonsense explanation 840 is provided to the classification model 815.

At a process 940, the classification model or module 815 (which may be consistent with classification models or modules 615 and 715) operates on the input data (e.g., set of question 810 and answer choices 820) to develop, derive, or generate predictions or results 850. In some examples, classification model 815 uses machine-generated explanation 840 to support or apply commonsense reasoning in its analysis. This can be accomplished, for example, as described with respect to the classification models 615 and 715 of FIGS. 6 and 7.

In some embodiments, the objective is to maximize:

$$\sum_i \log P(e_i \mid e_{i-k}, \ldots , e_{i-1}, C_{RE}; \Theta)$$

where k is the size of the context window (in our case k is always greater than the length of e so that the entire explanation is within the context). The conditional probability P is modeled by a neural network with parameters Θ conditioned on $C_{RE}$ and previous explanation tokens. This kind of explanation may be referred to as "reasoning" because it can be automatically generated during inference to provide additional context for commonsense question answering. It is shown below that this approach outperforms the reported state-of-the-art on CommonsenseQA by 10%.

The results and explanation of commonsense reasoning are provided as output (e.g., output 150 from commonsense explanation module 130).

Figure 10:
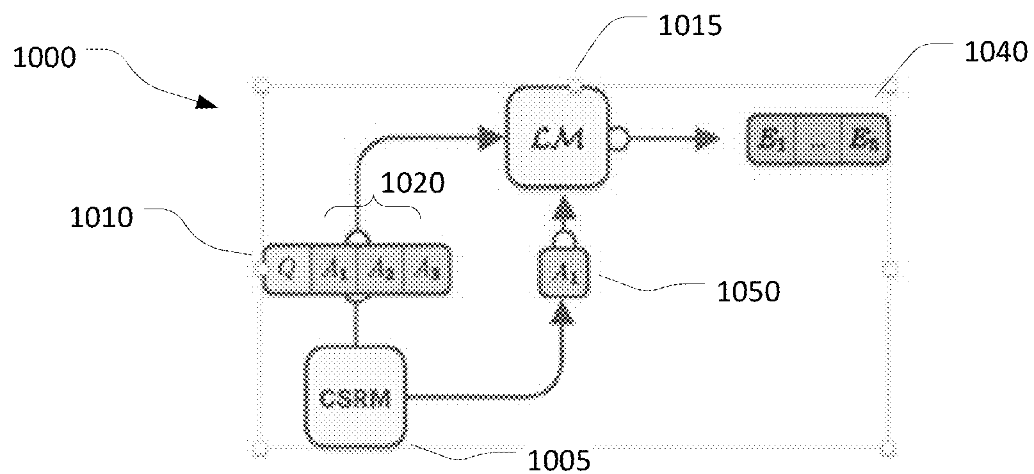
FIG. 10 is a simplified diagram illustrating a system of generating common sense explanations for rationalization by an artificial intelligence or deep learning model, according to some embodiments.
Figure 11:
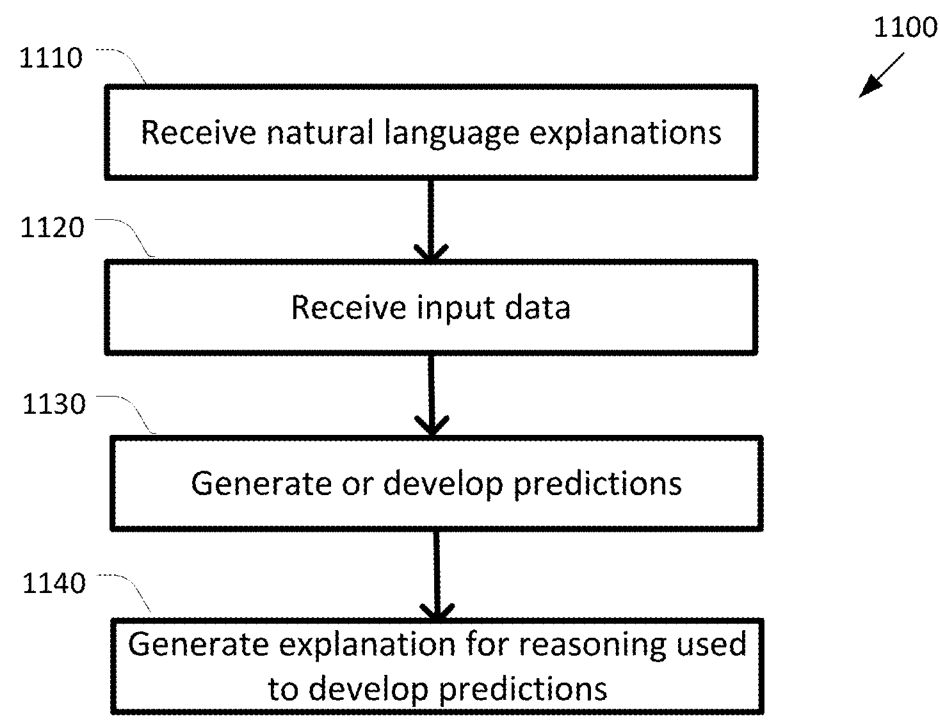
FIG. 11 is a simplified diagram of a method of generating common sense explanations for rationalization by an artificial intelligence or deep learning model, according to some embodiments.

Rationalization: The reverse approach to reasoning is rationalization. Rationalization is illustrated with respect to FIGS. 10 and 11. FIG. 10 is a simplified diagram illustrating a system 1000 of generating common sense explanations for rationalization by an artificial intelligence or deep learning model, according to some embodiments. FIG. 11 is a simplified diagram of a corresponding method 1100 for system 1000. One or more of the processes 1110-1140 of method 1100 may be implemented, at least in part, in the form of executable code stored on non-transitory, tangible, machine-readable media that when run by one or more processors may cause the one or more processors to perform one or more of the processes 1110-1140. In some embodiments, system 1000 can be implemented in, and method 1100 can be performed by, computing device 100 (e.g., commonsense explanation module 130) of FIG. 1.

With rationalization, as illustrated in FIGS. 10 and 11, a classification model or module 1015 (which may be consistent with classification models or modules 615 and 715) first makes the predictions a, and then a language model or module 1005 (which may be consistent with language models or modules 405 and 505) generates explanations based on those labels.

For training, at a process 1110, classification model 1015 operates on the input data (e.g., set of question 1010 and answer choices 1020) to develop, derive, or generate predictions or results 1050. The language model or module 1005 receives natural language explanations text. In some examples, the natural language explanations text (e.g., text 145) can include question q and answer choices c0, c1, c2, and explanations $e_h$ collected from or developed by humans, as previously described.

At a process 1120, the language model 1005 and the classification model 1015 receive input data (e.g., input data 140). The input data may relate to any situation, scenario, problem, etc. for which it is desirable to apply artificial intelligence, neural network, or deep learning model to analyze and make a prediction. In some embodiments, as shown, the input data may comprise a question Q 1010 and answer choice $A_1$, $A_2$, $A_3$ 1020.

At a process 1130, the classification model or module 1015 operates on the input data to develop, derive, or generate predictions or results 1050. This can be accomplished, for example, consistent with the description of the classification models or modules 615 and 715 of FIGS. 6 and 7. The results 1050 are provided to language model 1005.

In rationalization, the language model 1015 conditions on the predicted labels a along with the input to generate post-hoc rationalizations or, in other words, the explanation for reasoning used to develop predictions, at a process 1140. During the fine-tuning step of the language model 1005, the input context $C_{RA}$ contains the output label a and is constructed as follows:

$C_{RA}$="q, c0, c1, or c2? a because"

The training objective for the language model 1015 in rationalization is similar to that in reasoning except that in this case, the model 1015 has access to the ground truth labels to the input questions during training.

Because the language model or module 1005 is conditioned on the predicted label, the explanations are not considered commonsense reasoning. Instead, they offer a "rationalization" that makes the model more accessible and interpretable. It has been found that this approach of rationalization outperforms the state-of-the-art model by 6% as discussed below.

With respect to the systems and methods of FIGS. 8-11, some examples of computing devices, such as computing device 100 may include non-transitory, tangible, machine readable media that include executable code that when run by one or more processors (e.g., processor 110) may cause the one or more processors to perform the processes of methods 900 and 1100. Some common forms of machine readable media that may include the processes of methods 900 and 1100 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Results

Results on the CommonsenseQA dataset using variations of the proposed Commonsense Auto-Generated Explanations (CAGE) are presented. The $BERT_{LARGE}$ model serves as a baseline without any CoS-E or CAGE.

FIG. 12 illustrates a table 1200 showing a collection of examples from CommonsenseQA, CoS-E, and CAGE samples (for reason and rationale). It is observed that in some embodiments the CAGE-reasoning typically employs a simpler construction than CoS-E-open-ended. Nonetheless, this simple declarative mode can sometimes be more informative than CoS-E-open-ended. The systems and methods of the present disclosure implementing CAGE achieve this by either providing more explicit guidance (as in the final example 1202 of Table 1200) or by adding meaningful context (as in the third example 1204 by introducing the word 'friends'). It is observed from table 1200 that CAGE-reasoning, in some embodiments, contains at least one of the answer choices 43% of the time, out of which it contains the model's actual predicted answer choice 21% of the time. This suggests that there is more to the effectiveness of CAGE-reasoning than directly pointing to the answer.

From Table 1200, it is observed that CAGE-rationalization and CAGE-reasoning were often identical or differed only in word ordering or by replacing one of the answer choices with another. Humans could predict the answer based on just CAGE-rationalization 42% of the time, same as CAGE-reasoning. Although CAGE-rationalizations seem to be better than CAGE reasoning, we find that it does not drastically improve the model's language generating behavior which is what humans judge while trying to guess the right answer without the actual question.

An additional experimental setting only used open-ended explanations that did not contain any word from any answer choices. These explanations may be referred to as "CoS-E-limited-open-ended" explanations because they are limited in the choice of words allowed. It is observed that even using these limited kind of explanations improves over the BERT baseline, which suggests that the explanations are providing useful information beyond just mentioning the correct or incorrect answers.

FIG. 13 illustrates a table 1300 showing a comparison of results achieved with a BERT baseline that uses only the CommonsenseQA inputs against systems and methods, according to embodiments of the present disclosure, trained using inputs that contain explanations from CoS-E. As seen in table 1300, the BERT baseline model reaches 64% accuracy. Adding open-ended human explanations (CoS-E-open-ended) alongside the questions during training results in a 2% boost in accuracy by the question-answering model. When the model is further provided with explanations generated with CAGE-reasoning (not conditioned on the ground truth) during both training and validation, the accuracy of the model increases to 72%.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:

encoding and embedding, by an embedding module, an input text that is a concatenation of a structured source text for a question-answer set and a structured explanation text by breaking the input text into a plurality of tokens, the question-answer set comprising a question and a plurality of answer choices, wherein the structured explanation text is obtained based on a natural language response received from a human annotator in response to a training question-answer text;

iteratively decoding output of the embedding module, by a multi-layer transformer module, based on a subset of the plurality of tokens that are related to the structured explanation text, wherein each token from the subset of the plurality of tokens attends to context to a left of the each token in the structured source text, to generate an updated explanation text for deducing which of the answer choices is correct for the question;

providing the generated updated explanation text to a classification module; and using the generated explanation text, generating, at the classification module, a prediction for which one of the answer choices is correct for the question.

2. The method of claim 1, wherein the structured source text for the question-answer set comprises text in natural language form.

3. The method of claim 1, comprising providing the question-answer set to the classification module, wherein the question, the plurality of answer choices, and the generated explanation text are separated by separators when provided to the classification module.

4. The method of claim 1, wherein the embedding module and the multi-layer transformer module comprise at least a part of a natural language model.

5. The method of claim 1, wherein the classification module comprises a multi-layer transformer encoder.

6. A system comprising:

a memory storing a plurality of processor-executable instructions; and a processor reading the plurality of processor-executable instructions to perform operations comprising:

encoding and embedding, by an embedding module, an input text that is a concatenation of a structured source text for a question-answer set and a structured explanation text by breaking the input text into a plurality of tokens, the question-answer set comprising a question and a plurality of answer choices, wherein the structured explanation text is obtained based on a natural language response received from a human annotator in response to a training question-answer text;

iteratively decoding output of the embedding module, by a multi-layer transformer module, based on a subset of the plurality of tokens that are related to the structured explanation text, wherein each token from the plurality of tokens attends to context to a left of the each token in the structured source text, to generate an updated explanation text for deducing which of the answer choices is correct for the question; and generating, using the generated explanation text, a prediction for which one of the answer choices is correct for the question.

7. The system of claim 6, wherein the structured source text for the question-answer set comprises text in natural language form.

8. The system of claim 6, wherein the memory further stores at least a part a neural network.

9. The system of claim 6, wherein the question, the plurality of answer choices, and the generated explanation text are separated by separators.

10. The system of claim 6, wherein the memory further stores at least a part of a natural language model.

11. The system of claim 6, wherein the prediction is generated via a multi-layer transformer encoder.

12. A non-transitory machine-readable medium comprising executable code which when executed by one or more processors associated with a computer are adapted to cause the one or more processors to perform a method comprising:

encoding and embedding, by an embedding module, an input text that is a concatenation of a structured source text for a question-answer set and a structured explanation text by breaking the input text into a plurality of tokens, the question-answer set comprising a question and a plurality of answer choices, wherein the structured explanation text is obtained based on a natural language response received from a human annotator in response to a training question-answer text;

iteratively decoding output of the embedding module, by a multi-layer transformer module, based on a subset of the plurality of tokens that are related to the structured explanation text, wherein each token from the plurality of tokens only attends to context to a left of the each token in the structured source text, to generate an updated explanation text for deducing which of the answer choices is correct for the question;

providing the generated explanation text to a classification module; and using the generated explanation text, generating, at the classification module, a prediction for which one of the answer choices is correct for the question.

13. The non-transitory machine-readable medium of claim 12, wherein the structured source text for the question-answer set comprises text in natural language form.

14. The non-transitory machine-readable medium of claim 12, comprising executable code which when executed by the one or more processors are adapted to cause the one or more processors to collect the structured explanation text from the human annotator.

15. The non-transitory machine-readable medium of claim 12, comprising executable code which when executed by the one or more processors are adapted to cause the one or more processors to provide the question-answer set to the classification module, wherein the question, the plurality of answer choices, and the generated explanation text are separated by separators when provided to the classification module.

16. The non-transitory machine-readable medium of claim 12, wherein the embedding module and the multi-layer transformer module comprise at least a part of a natural language model.

17. The non-transitory machine-readable medium of claim 12, wherein the classification module comprises a multi-layer transformer encoder.

* * * * *